United States Patent Office

Re. 26,301
Reissued Nov. 21, 1967

26,301

METHOD OF IN SITU FABRICATION OF A MONOLITH REFRACTORY LINING

Maurice D. Cook, Richmond, Va., and Peter T. Troell, Bethel Park, Pa., assignors to Harbison-Walker Refractories Company, Pittsburgh, Pa., a corporation of Pennsylvania Original No. 3,201,501, dated Aug. 17, 1965, Ser. No. 283,716, May 28, 1963. Application for reissue Jan. 24, 1967, Ser. No. 617,430

8 Claims. (Cl. 264—30)

Matter enclosed in heavy brackets [ ] appears in the original patent but forms no part of this reissue specification; matter printed in italics indicates the additions made by reissue.

This invention relates to improved methods of in situ fabrication of monolithic refractory linings in metallurgical furnaces, vessels and similar high temperature environments requiring the use of high temperature construction material. According to a more specific aspect, this invention relates to improved methods of gunning refractories.

Various types of refractory materials are used in large tonnages for installing complete linings and maintaining existing linings by means of pneumatic emplacement. Basic refractory gunning mixes are supplied for maintaining open hearth and electric furnace walls and roofs and like environments coming in contact with chemically basic fumes and slags. Fireclay and high alumina gunning mixes are used in the maintenance of glass furnace linings and in the walls and arches in slab heating furnaces, soaking pits and similar environments in which neutral or acid refractories are required. This invention relates particularly to the class "basic" refractories.

There are two types, generally, of basic gunning refractories, as far as methods of installation are concerned. The first is finely divided air-setting refractory. It may be applied to cold surfaces but is particularly useful where installation temperatures are high. This material is finely divided and, normally, is blended with water to form a slurry in a mixer for application with a "wet gun." The second type, also applicable in the present invention, uses a coarser size graded mix, wherein, normally, water is mixed with the refractory material at the gunning apparatus nozzle. This is a "dry gun" application.

One of the most distressing problems attendant on methods of gunning refractory is the high losses due to refractory material bouncing back off a wall or the situs upon which it is being emplaced. This loss is termed "rebound" in the art. Rebound loss has been as high as 40 and 50%. Use of plasticizers, such as bentonite clay and the like, in relatively small amounts has reduced the rebound loss to on the order of 20%. However, 20% loss is still too high to be entirely satisfactory. Also, such plasticizer materials undesirably lower the refractoriness of the basic refractory gunning mix to which they are added. What has been needed is a means of reducing the rebound loss to very low percentages, without otherwise lessening the refractoriness and strength of the refractory material which is actually emplaced at an installation.

Accordingly, it is an object of this invention to provide improved methods of in situ fabrication of monolith refractory linings by gunning. It is another object of the invention to provide improved methods of gunning refractory material, by maintaining rebound losses considerably below what has heretofore been considered possible. It is still another object of the invention to provide improved methods of gunning basic refractory materials, which does not detract from the otherwise beneficial refractory and strength characteristics of such basic refractory gunning mixes.

Briefly, according to one aspect of the invention, improved gunning with a minimum of rebounds can be accomplished as follows: Suitably size graded, basic refractory material of the group chrome ore, dead burned magnesite, dead burned dolomite, forsterite, olivine, etc., is prepared. To this refractory is added only a small amount, between about 0.5 and 5%, by weight, of fiber asbestos of a particular type, which is intimately admixed therewith. If the refractory is of the finely divided air-setting type, the refractory and asbestos mixture is further mixed with an aqueous carrier fluid (about 35% by weight), preferably water, to obtain a free-flowing somewhat "soupy" slurry which is easily pumped through the emplacement or gunning apparatus (a "wet gun"). In the case of the coarser size graded refractory, the asbestos and refractory aggregate are pneumatically conveyed through the gunning apparatus and, immediately before discharge (at the nozzle), are intimately admixed with the aqueous carrier fluid (a "dry gun"). It has been discovered that this small amount of asbestos fibers added to the refractory gunning mix reduces rebound losses to below 5%, as compared to identical mixes including such as bentonite, which have rebound losses on the order of 17%; and identical mixes, having neither the asbestos nor the bentonite, which have rebound losses on the order of 43%. It is desirable that the asbestos be maintained below about 5% of the total mix, since above that amount there is an undesirable decrease in density.

The present invention is based on both physical and chemical findings which have yielded basic refractory gunning mixes of outstanding quality. The improvement in gunned adherence and the reduction of rebound loss which are dealt with hereafter are the primary benefits which were bestowed on the example mixes by the use of controlled amounts of asbestos fibers. However the inclusion of such an ingredient would ordinarily have been deleterious to refractoriness, and fails to be so only when using asbestos of particular composition. The principal constituents of the mixes are basic in character and additions should not react with them deleteriously. This does no occur if the asbestos selected is one of the Mg–Si types.

Generally asbestos tyeps are named after their chief mineral constituent. Examples are crysotile, crocidolite and tremolite, stated as $H_4Mg_3Si_2O_9$, $$NaFe(SiO_3)_2 \cdot FeSiO_3$$

and $CaMg_3(SiO_3)_4$.

For short, we refer to the first as an Mg–Si asbestos since oxides of these two metals are its principal ingredients. This is the type of asbestos preferably used in the invention. The oxides MgO and $SiO_2$ as present in the Mg–Si asbestos fibers do not diminish the refractoriness of the gunning mixes, at least to any appreciable extent. Crocidolite asbestos, although a common article of trade is predominantly iron oxide, silica and sodium oxide, and is less refractory. Tremolite is similarly low in refractoriness. The Mg–Si asbestos may even become enriched with MgO, present in many of the subject compositions, to form an even more refractory product: forsterite.

It is interesting to note that fibrous inorganic material, such as asbestos, has been suggested previously in relatively large amounts, i.e. 15 or 20 to 40%, by weight, in combination with hydraulic setting cements to obtain an insulating material which can be trowelled in place. Asbestos without discrimination regarding its chemical composition has, of course, long been used in combination with gypsum and the like to make wall board, since the art has, generally, recognized asbestos as a low heat-conducting nonflammable filler having good insulating properties. Asbestos has, also, been mixed with various inorganic rubber-like binder materials and coloring agents to provide a fire-resistant composition but without regard to any properties of refractoriness.

The following examples of the present invention are given by way of explanation and not by way of limitation. All parts and percentages are by weight. All chemical analyses are on the basis of an oxide analysis, unless stated to the contrary. All sizing is according to the Tyler standard sieve series and, of course, all sizing and chemical analyses should be considered by typical. Examples I through III are representative of the finer sizings.

Example I

A mixture is prepared of about 77% −65 mesh Philippine chrome ore, about 20% −65 mesh dead burned magnesite and about 2% of dry, powdered sodium silicate, having a sodium oxide/silica ratio on the order of 1 to 3.22, and 1.0% of Mg–Si asbestos fibers (shorts). This is an example of a "wet gun" mix.

Example II

A mixture is prepared of 95% −65 mesh Philippine chrome ore, about 2% of a dry sodium silicate having a sodium oxide/silica ratio of about 1 to 3.22, and 3% of Mg–Si abestos fibers.

Example III

A mixture is prepared comprised of about 95 parts of −65 mesh dead burned magnesite, about 2.5 parts of dry sodium silicate having a sodium oxide/silica ratio on the order of 1 to 3.2, and about 2.5 parts of Mg–Si asbestos shorts.

Example IV

Any of the mixtures of Examples I, II and II, may be used in other grinds in which the size grading is coarser (for "dry gun" applications) to provide an overall grind of about 60 parts +65 mesh and about 40 parts −65 mesh. It is preferable that the majority of the +65 mesh fraction be coarser than a 28 mesh screen. Carrier fluid amounts to about 20% by weight for the "dry gun." On the wall, the mix has the consistency of partially set-up concrete.

Example V

Any of the mixtures of Examples I through III may be modified by substituting up to about 35% of dead burned dolomite, lime, forsterite, olivine and other recognized basic refractory materials for some of the chrome ore or dead burned magnesite.

In the above examples, sodium silicate is considered to be a binder. In some instances, no binder is necessary, such as in high temperature installations where high purity dead burned magnesite is used, since the magnesite will sinter in place. Also, other bonds besides the sodium silicate can be used, such as, for example, the art recognized ones calcium aluminates, sulfuric acid, magnesium sulphite, chromic acid, hydrochloric acid, magnesium chloride, sodium chromate, sodium dichromate, sulfite waste liquor (concentrated lignin waste), carbohydrate (dextrin, starch, sugar), pitch, and tar or tall oil.

In actual service trials of refractory mixtures of the type described under Example IV, excellent strength was obtained, i.e. a cold crushing strength of over 7000 p.s.i. after a 1500° F. reheat. A similar mix using bentonite but no asbestos shorts had a cold crushing strength, under similar conditions, of only 4760 p.s.i. In still further field trials, using a mix similar to Example I, above, a cold crushing strength after a 1500° F. reheat of 7850 p.s.i. was obtained according to the invention. A comparable mix with bentonite but no asbestos fibers had a cold crushing strength of only 3440 p.s.i., under similar conditions. Thus, the addition of asbestos shorts not only reduces rebound loss to an unexpected degree, but also greatly increases the strength of the installation. We theorize this increased strength is partly because of the refractory character of the Mg–Si asbestos fibers which are essentially magnesium silicate. Thus, we can generally say that inorganic refractory fibers, having properties of Mg–Si asbestos fibers, may be used according to this invention. It seems likely that the frayed or tattered nature of the Mg–Si asbestos fibers has a bearing on their effectiveness in reducing rebounds of gunned granular mixes. There is no proof of this, but it seems possible that the frayed fibers, in contrast to so many of the smoothly drawn synthetics such as fiberglass, serve actually to entangle particles which would otherwise fall or rebound. It may be useful for the fibers to be wettable and tend to hold water.

Another way of defining satisfactory asbestos-type fibers for the practice of this invention is, inorganic fibers, the components of which are capable of chemically reacting with the components of basic refractory gunning mixes to form high melting point reaction products.

Typical analyses of the chrome ore and magnesia or dead burned magnesite (these terms normally are used synonymously in this art) mentioned in the examples are as follows:

| | Dead Burned Magnesite | Philippine Chrome Ore |
|---|---|---|
| $SiO_2$ | 2.8 | 5.5 |
| $Al_2O_3$ | 0.3 | 29.2 |
| $Fe_2O_3$ | 0.6 | |
| CaO | 1.5 | 0.6 |
| MgO | 94.8 | 18.9 |
| FeO | | 12.6 |
| $Cr_2O_3$ | | 32.2 |
| Ignition Loss | | 1.0 |

Having thus described the invention in detail and with sufficient particularity as to enable those skilled in the art to practice it, what is desired to have protected by Letters Patent is set forth in the following claims.

We claim:

1. Method of gunning an unconsolidated basic refractory material on its situs of use, with a minimum of rebound, to form a basic refractory monolith, at least about 60% of the refractory material being *selected from the group consisting of* chrome ore [and], magnesia, *and a mixture of chrome ore and magnesia,* comprising the steps of size grading selected basic refractory material, adding from 0.5 to 5 parts, by weight, of fibrous asbestos to about 100 parts, by weight, of said size graded refractory material, the chemical components of said asbestos capable of chemically reacting with said refractory material at service temperatures substantially without impairing the refractoriness of the resulting monolith, mixing the refractory material and fibrous asbestos with an aqueous carrier fluid and forceful impacting the resulting slurry on the situs of use.

2. Method of gunning an unconsolidate basic refractory material on its situs of use with a minimum of rebound to form a basic refractory monolith, comprising the steps of size grading basic refractory material of the group consisting essentially of chrome ore and magnesia, adding from 0.5 to 5 parts, by weight, of fibrous asbestos to about 100 parts, by weight, of said size graded refractory material, the chemical components of said asbestos capable of chemically reacting with said refractory materials substantially without impairing the refractoriness of the resulting monolith, mixing the refractory material and fibrous asbestos with from 20 to 40% by weight of an aqueous carrier fluid, and forcefully impacting the resulting mass on the situs of use.

3. Method of claim 2 in which the refractory material is substantially all chrome ore.

4. Method of claim 2 in which a major portion of the refractory material is −65 mesh chrome ore.

5. Method of claim 2 in which the fibrous asbestos is crysotile fibers and in which the maximum fiber length is on the order of 2 inches.

6. Method of claim 1 in which the refractory materials include on the order of about 2 parts, by weight, sodium silicate binder.

7. Method of preparing an unconsolidated batch of basic refractory gunning material for use in forming a basic refractory monolith on its situs of use, comprising the steps of size grading selected basic refractory material, at least about 60% of the refractory material being *selected from the group consisting of* chrome ore [and], magnesia, *and a mixture of chrome ore and magnesia,* adding from 0.5 to 5 parts, by weight, of fibrous asbestos to about 100 parts, by weight, of said size graded refractory material, the chemical components of said asbestos capable of chemically reacting with said refractory materials substantially without impairing the refractoriness of the resulting monolith, mixing the refractory material and asbestos.

8. Method of claim 7 in which a major portion of the refractory material is —65 mesh chrome ore.

References Cited

The following references, cited by the Examiner, are of record in the patented file of this patent or the original patent.

UNITED STATES PATENTS

| | | | |
|---|---|---|---|
| 2,809,126 | 10/1957 | Murphy et al. | 106—66 |
| 2,937,101 | 5/1960 | Nelson et al. | 106—58 |

ROBERT F. WHITE, *Primary Examiner.*

J. A. FINLAYSON, *Assistant Examiner.*